(12) United States Patent
Kelly (10) Patent No.: US 8,294,994 B1
(45) Date of Patent: Oct. 23, 2012

(54) IMAGE WAVEGUIDE HAVING NON-PARALLEL SURFACES

(75) Inventor: Daniel G. Kelly, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/209,268

(22) Filed: Aug. 12, 2011

(51) Int. Cl.
*G02B 27/14* (2006.01)

(52) U.S. Cl. ........................................ 359/630

(58) Field of Classification Search ............ 359/630
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |

(Continued)

FOREIGN PATENT DOCUMENTS

GB 2272980 A 6/1994

(Continued)

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — James Jones
(74) *Attorney, Agent, or Firm* — Blakely Sokoloff Taylor & Zafman LLP (57) ABSTRACT

An image waveguide includes first and second surfaces being non-parallel and opposite to each other. The image waveguide receives input light from an image source along an optical path disposed at least partially between the first and second surfaces. The first reflective surface receives and reflects light from the image source to the second reflective surface. The image waveguide further includes an out-coupling region included in the first reflective surface. The second reflective surface receives and reflects light from the first reflective surface to the out-coupling region to pass light out of the waveguide.

21 Claims, 6 Drawing Sheets

U.S. PATENT DOCUMENTS

| | | |
|---|---|---|
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,210,803 B2 * | 5/2007 | Matsunaga .................. 359/857 |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2003/0107816 A1 * | 6/2003 | Takagi et al. .................. 359/631 |
| 2004/0190150 A1 * | 9/2004 | Nagaoka ....................... 359/630 |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0213664 A1 | 9/2011 | Osterhout et al. |

FOREIGN PATENT DOCUMENTS

WO     WO 96/05533 A1     2/1996

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

IMAGE WAVEGUIDE HAVING NON-PARALLEL SURFACES

TECHNICAL FIELD

This disclosure relates generally to the field of optics, and in particular but not exclusively, relates to near-to-eye optical systems.

BACKGROUND INFORMATION

A head mounted display (HMD) is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image (CGI), while other types of HMDs are capable of superimposing CGI over a real-world view. The former type of HDM is often referred to as virtual reality (VR) while latter type of HMD is often referred to as augmented reality (AR) because the viewer's image of the world is augmented with an overlaying CGI, also referred to as a heads-up display (HUD).

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, form factor, and efficiency of conventional optical systems used to implement existing HMDs.

SUMMARY

Implementations of techniques, apparatuses, and systems are provided for an image waveguide for use in a heads-up-display capable of providing a virtual reality or an augmented reality to a user. In one aspect, the image waveguide includes first and second surfaces being non-parallel and opposite to each other, the image waveguide to receive input light from an image source, the first reflective surface to receive and reflect light from the image source to the second reflective surface; and an out-coupling region included in the first reflective surface to pass light out of the first reflective surface, the second reflective surface to receive and reflect light from the first reflective surface to the out-coupling region.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It will be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system and method to utilize a waveguide having two non-parallel surfaces are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
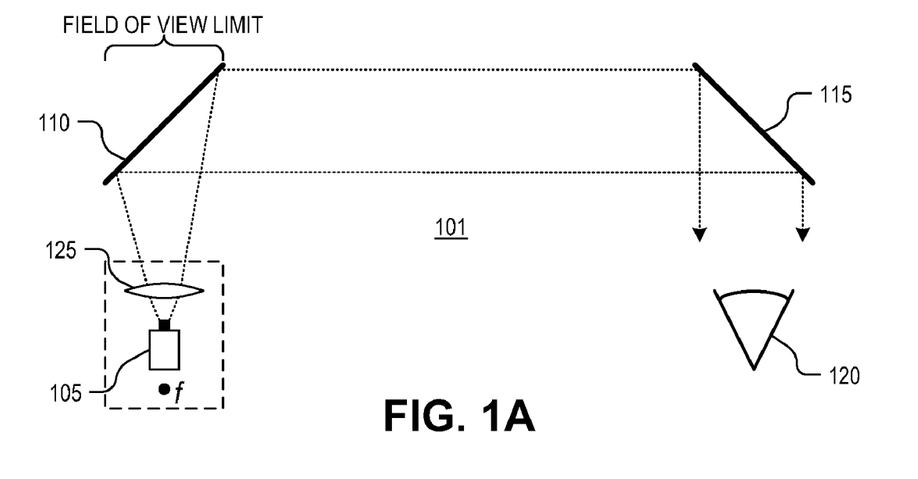
FIG. 1A illustrates a first conventional near-to-eye optical system using an input lens and two mirrors in accordance with an embodiment of the disclosure.

FIG. 1A illustrates a first conventional near-to-eye optical system 101 using an input lens and two mirrors according to an embodiment of the disclosure. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system requires a lens 125 interposed between the first mirror 110 and image source 105. Lens 125 creates a virtual image that is displaced further back from the eye than the actual location of mirror 115 by positioning image source 105 inside of the focal point f of lens 125. Optical system 101 suffers from a relatively small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited and the thickness of the waveguide rapidly increases to achieve larger fields of view, adversely affecting the form factor of system 101.

Figure 1B:
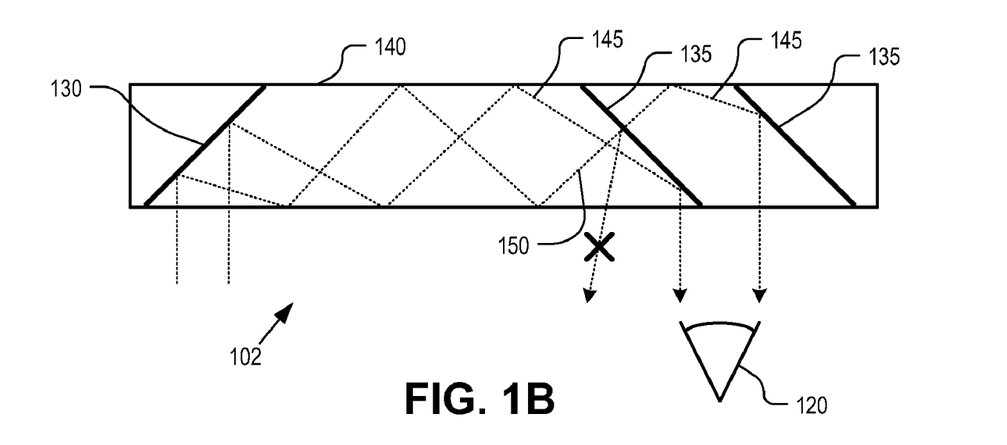
FIG. 1B illustrates a second conventional near-to-eye optical system using angle sensitive dichroic mirrors in accordance with an embodiment of the disclosure.

FIG. 1B illustrates a second conventional near-to-eye optical system 102 using angle sensitive dichroic mirrors according to an embodiment of the disclosure. Optical system 102 includes a single in-coupling mirror 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, optical system 102 still has a non-ideal form factor and the nature of dichroic mirrors 135 that passes some incident angles while reflecting others limits the field of view optical system 102 and the dichroic mirror coating does not provide sharp angular cut-offs, resulting in ghosting effects.

Figure 1C:
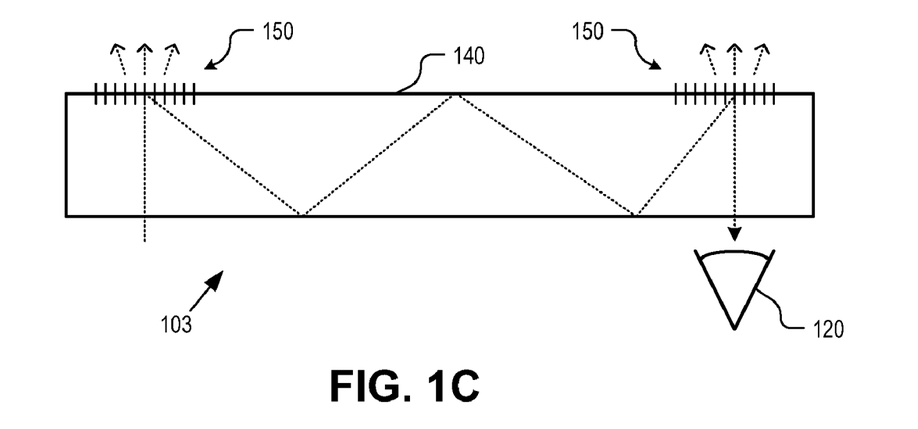
FIG. 1C illustrates a third conventional near-to-eye optical system using holographic diffraction gratings in accordance with an embodiment of the disclosure.

FIG. 1C illustrates a third conventional near-to-eye optical system 103 using holographic diffraction gratings according to an embodiment of the disclosure. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a non-ideal form factor and limited field of view.

Figure 2:
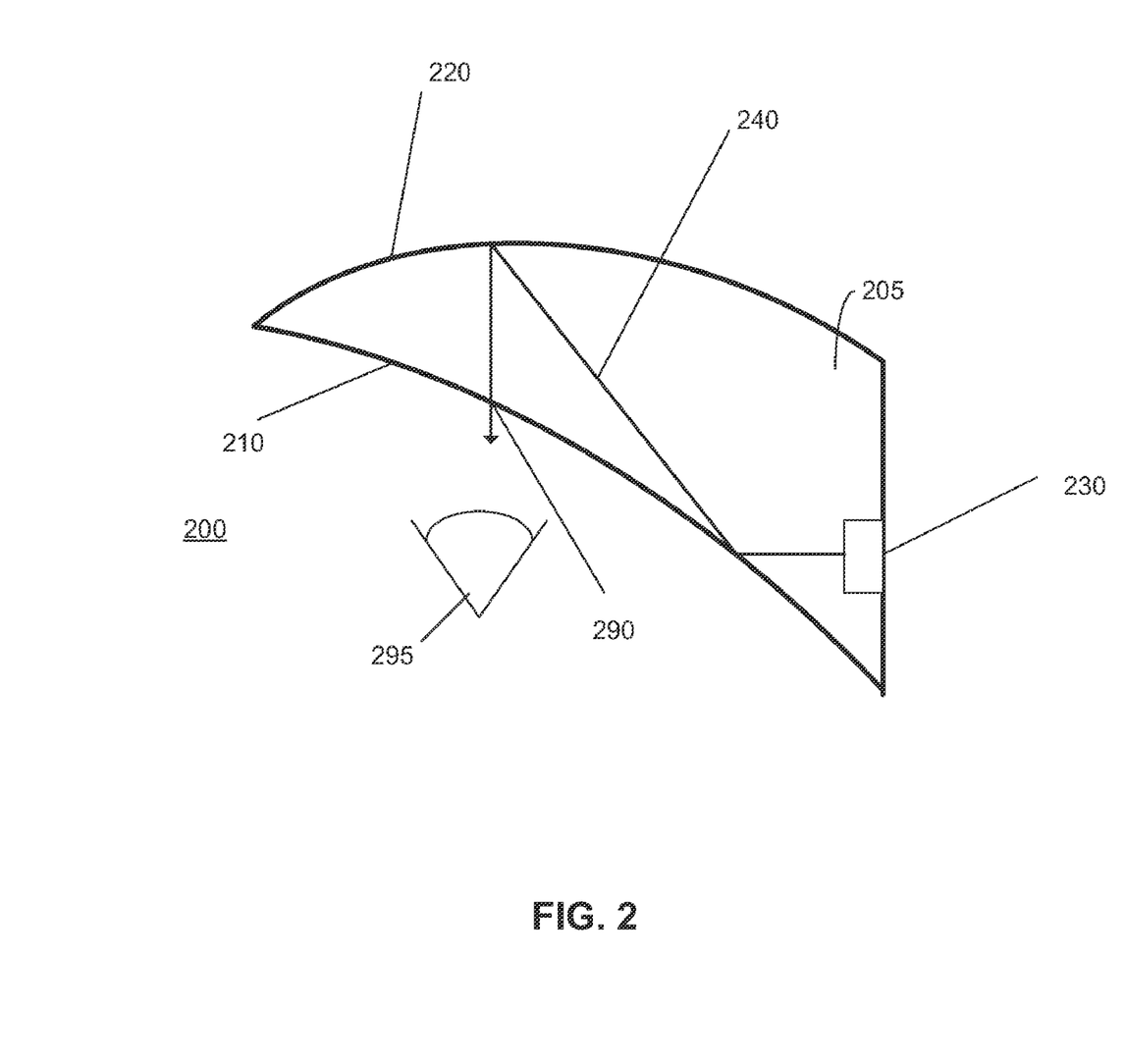
FIG. 2 illustrates a cross-sectional view of a waveguide in accordance with an embodiment of the disclosure.

FIG. 2 illustrates a cross-sectional view of a waveguide in accordance with an embodiment of the disclosure. The illustrated embodiment is a cross-sectional view on an image waveguide for generating a near-to-eye image.

Waveguide 200 includes first and second reflective surfaces, 210 and 220, which are non-parallel and opposing each other. Said reflective surfaces form waveguide core 205, which may comprise air, glass, crystal or any other optically transparent material. Image source 230 will output light 240 onto surface 210, which will reflect the light to surface 220. Light 240 is then reflected back on to surface 210, and will exit out of out-coupling region 290 towards a user's eye 295 to display a computer generated image (CGI) to the user. Out-coupling region 290 may comprise openings, diffraction gratings, non-reflective optically transmissive regions, or any functionally equivalent means to allow light to exit waveguide 200.

In this embodiment, illumination source 230 is shown to be an emission type display (e.g., an Organic Light Emitting Diode (OLED), a backlit LCD display). In other embodiments, illumination source 230 may utilize an independent lamp and a reflective display (e.g., Liquid Crystal on Silicon (LCOS)). Of course, other display technologies may be used.

Each of reflective surfaces 210 and 220 may be of aspherical shape (i.e., a shape whose profile is not a portion of a sphere or cylinder) or of free-form shape (i.e., a shape whose profile is not governed by a typical elliptical or spherical equation) such that light 240 is reflected between the surfaces for a desired number of times and exits through out-coupling region 290 towards a user's eye 295 at a desired angle. In one embodiment, reflective surface 220 is shaped to have a curvature that will magnify the CGI of light 240 when it reflects the light back to surface 210.

As can be seen in the illustrated embodiment, the curvature of reflective surfaces 210 and 220 allow waveguide 200 to have an improved form factor compared to waveguides in the prior art used in a head mounted display (HMD). Embodiments of the invention such as waveguide 200 may be used in a single eye display (i.e., a monocular HMD) or a dual eye display (i.e., a binocular HMDs). Waveguide 200 may be used to display only a CGI (i.e., a virtual reality (VR) system) wherein at least reflective surface 220 will be fabricated with a non-optically transmissive material—e.g., a reflective metal film, such as, aluminum, nickel, gold, chromium, tin, or otherwise. In one embodiment, reflective surfaces 220 and 230 are fabricated using a dichroic film, which enables wavelength selectivity for specific transmission and reflection behavior. In one embodiment, reflective surface 220 is fabricated using a polymer dispersed liquid crystal material whose opacity may change in response to an electrical difference applied to the surface—thus, reflective surface 220 can be non-optically transmissive when displaying a CGI, and optically transmissive otherwise.

Waveguide 200 may also be used in an HMD capable of superimposing CGI over a real-world view (i.e., an augmented reality (AR) system) where the user's image of the world is augmented with an overlaying CGI, also referred to as a heads-up display (HUD). For HUDs, both reflective surfaces 210 and 220 are partially transparent and partially reflective.

In embodiments where waveguide 200 is fabricated with an optically transmissive, light guiding material, a wire-grid polarizer may be used. A wire-grid polarizer includes an array of wires placed in a plane. Electromagnetic waves which have a polarization component of their electric fields aligned parallel to the wires induce the movement of electrons along the length of the wires and reflect this component of the incident light. The polarization component that is perpendicular to the wires passes through the wire-grid polarizer substantially unaffected. Thus, a wire-grid polarizer permits some ambient external light to pass through waveguide 200 into eye 295 of a user, while allowing the CGI to augment a real-world view to produce AR.

Figure 3:
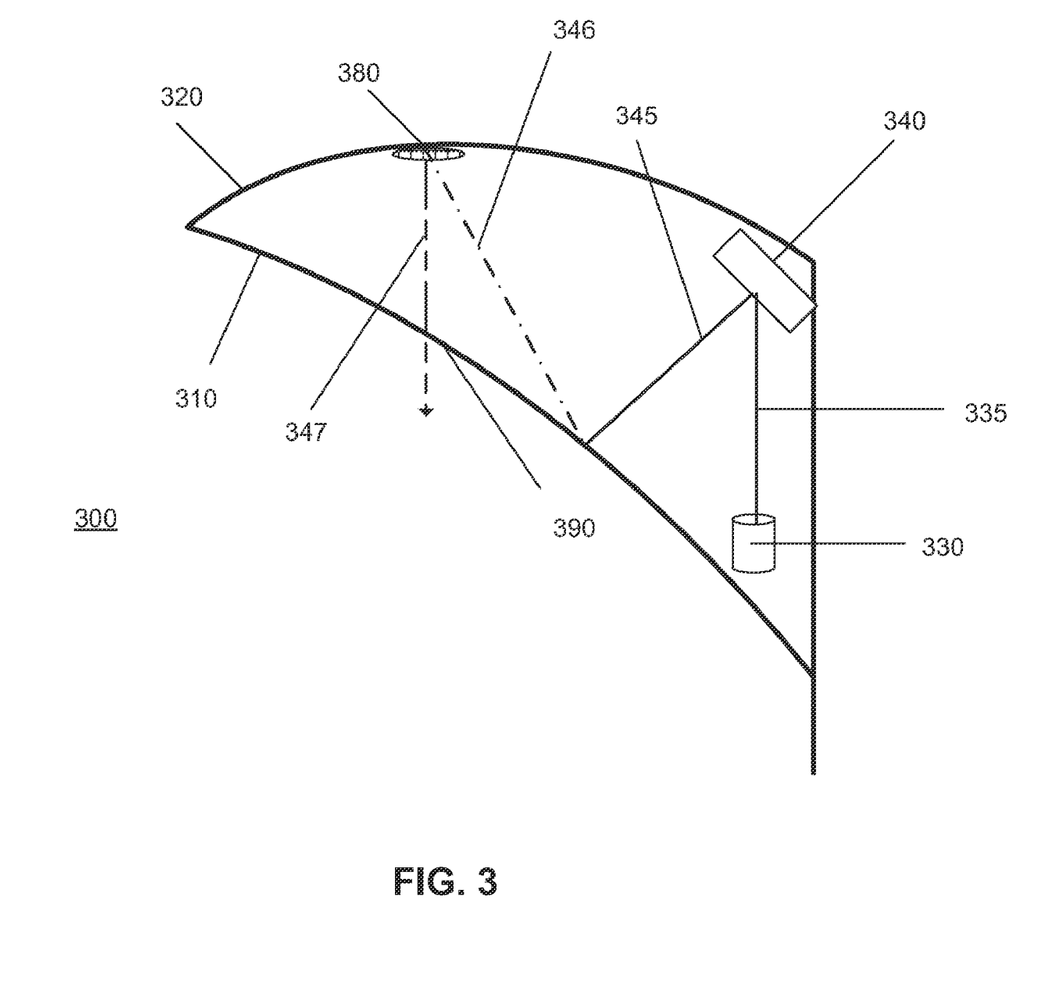
FIG. 3 illustrates a cross-sectional view of a waveguide having optically transmissive reflective surfaces in accordance with an embodiment of the disclosure.

FIG. 3 illustrates a cross-sectional view of a waveguide having partially reflective surfaces in accordance with an embodiment of the disclosure. Waveguide 300 includes first and second partially reflective surfaces, 310 and 320, which are non-parallel and opposing each other. In this embodiment, illumination source 330 is illustrated to be included in waveguide 300; in other embodiments, an illumination source is external to the waveguide, and light emitted from the illumination source enters the waveguide through an in-coupling region.

Illumination source 330 emits light onto reflective display 340 (shown as light 335), which reflects the light onto surface 310 (shown as light 345). This light will be reflected off of surface 310 to surface 320 (shown as light 346). The light is then reflected back to surface 310 (shown as light 347), and exits out of out-coupling region 390.

Surfaces 310 and 320 comprise partially reflective and partially transmissive materials to be used in an AR system. In this embodiment, surface 310 is a reflective polarizer i.e., surface 310 may be fabricated from an optically transmissive material and a reflective polarizing film or a wire-grid polarizer as described above. Surface 310 will selectively reflect polarized light received from display 340 to surface 320. In this embodiment, surface 320 includes polarization rotator 380 to rotate light 346 and reflect it as light 347. Thus, surface 310 may reflect a first polarization component of light 345 as light 346, and polarization rotator 380 will rotate light 346 into light 347 having a second polarization component.

For example, surface 310 may selectively reflect P-polarized light 346 onto surface 320; polarization rotator 380 may be a half-wave plate rotator, and will rotate P-polarized light 346 such that it is reflected as S-polarized light 347. It is understood that because surface 310 selectively reflects P-polarized light only, S-polarized light 347 will pass though the surface at out-coupling region 390.

Figure 4A:
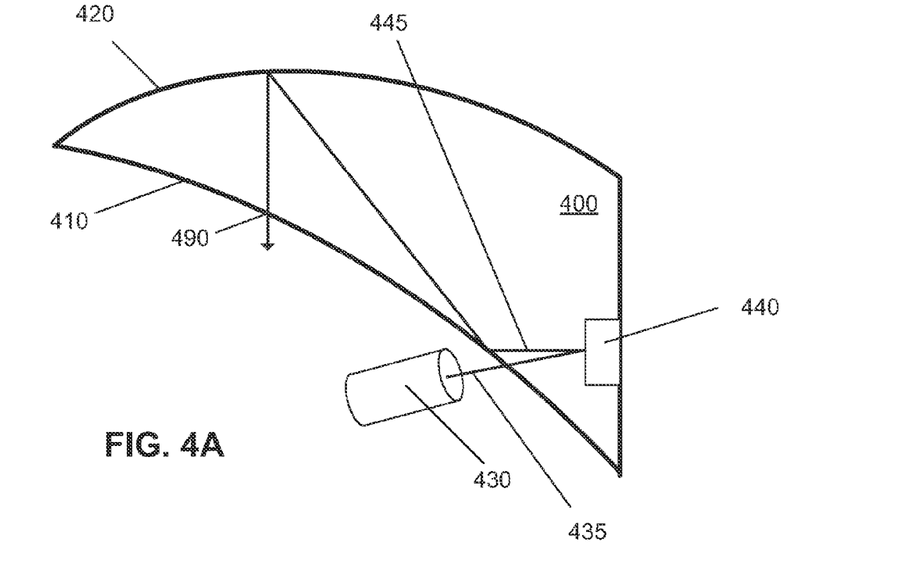
FIG. 4A and FIG. 4B illustrate a waveguide utilizing a projector image source in accordance with an embodiment of the disclosure.
Figure 4B:
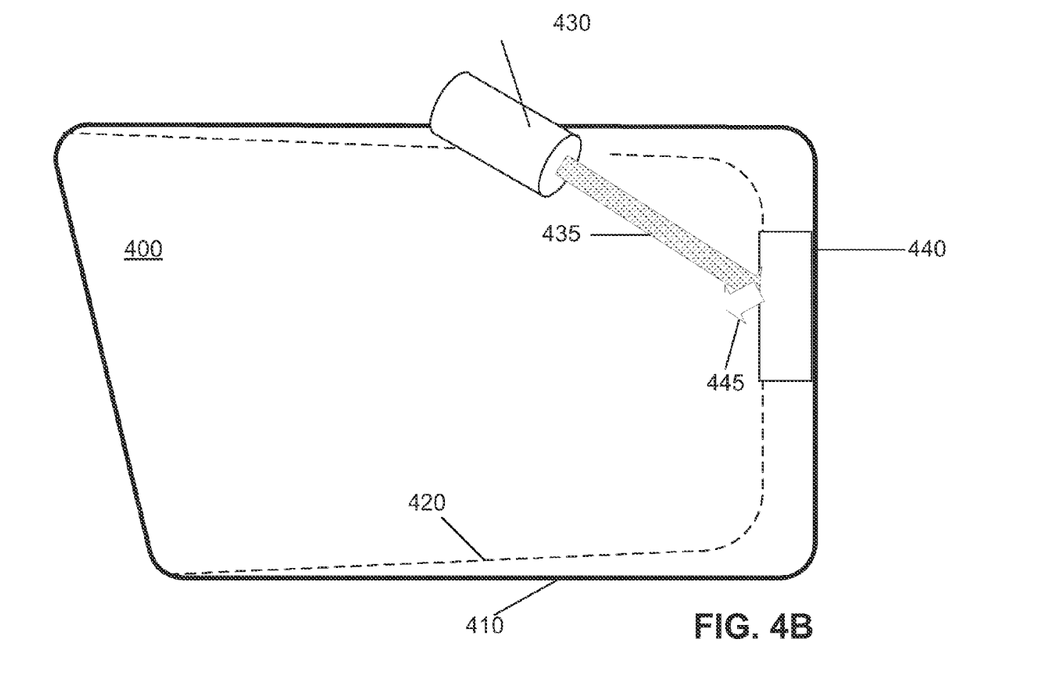

FIGS. 4A and 4B illustrate a waveguide utilizing an illumination source in accordance with an embodiment of the disclosure. FIG. 4A illustrates a top cross-sectional view of waveguide 400, while FIG. 4B illustrates a rear-view of waveguide 400. In this embodiment, waveguide 400 includes first and second reflective surfaces, 410 and 420, which are non-parallel and opposing each other. Illumination source 430 and reflective display 440 may work in combination to produce image data light (e.g., illumination source 430 and reflective display 440 may comprise an LCOS system, where the reflective display is an LCOS panel). Illumination source 430 emits light onto reflective display 440 (shown as light 435). Reflective display 440 modulates image data onto the received light to generate image data light (shown as light 445) and reflects this light to reflective surface 410. This light reflects off of surface 410 to surface 420. The light is then reflected back to surface 410, and exits out of out-coupling region 490.

In this embodiment, to utilize the improved form factor created by non-parallel, reflective surfaces 410 and 420, illumination source 430 is positioned above reflective display 440. Thus, as can be see in FIG. 4B, illumination source 430 may be placed at the top of the eyepiece that includes waveguide 400; when worn by a user, illumination source 430 may be above the user's eye (e.g., at eyebrow level) so as not to interfere with the field of view, and may be included in a top portion of the frame of the HMD so as not to adversely affect the form factor.

Figure 5:
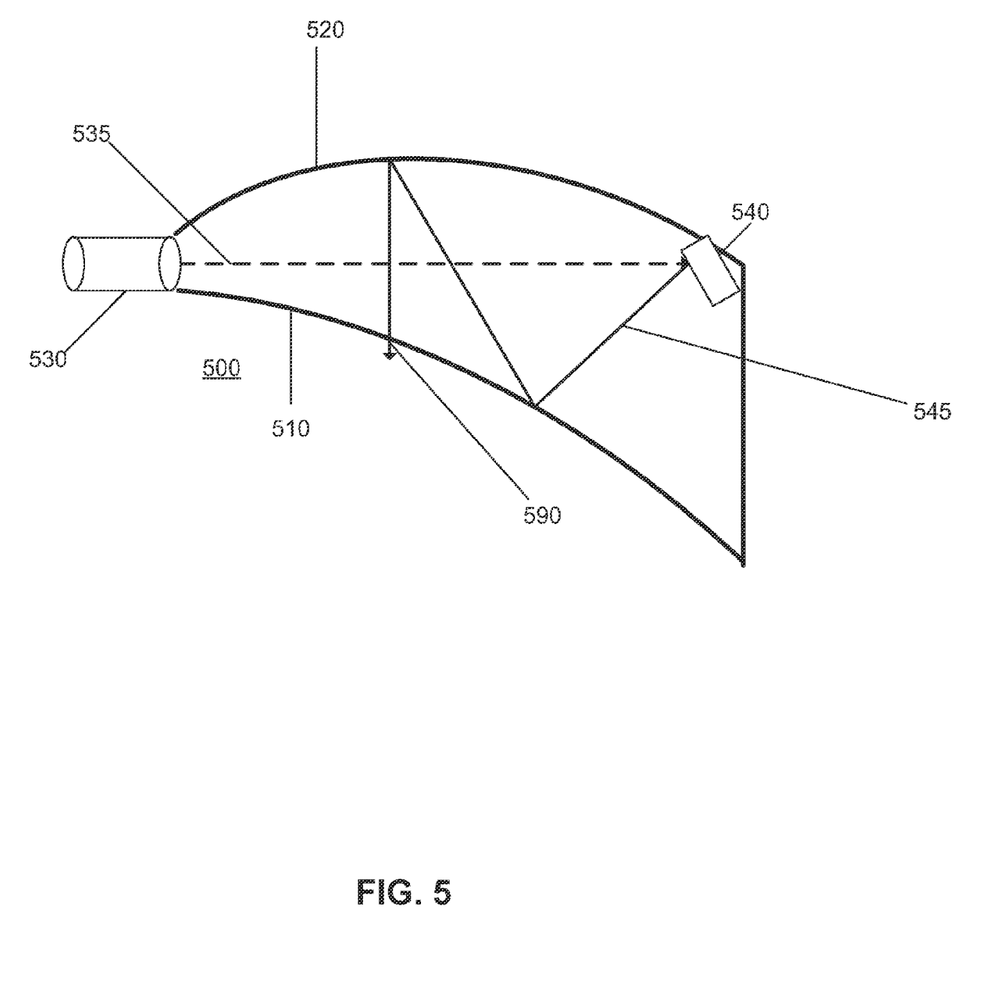
FIG. 5 illustrates a cross-sectional view of a waveguide utilizing a projector image source in accordance with an embodiment of the disclosure.

FIG. 5 illustrates a cross-sectional view of a waveguide utilizing an image source in accordance with an embodiment of the disclosure. Waveguide 500 includes first and second reflective surfaces, 510 and 520, which are non-parallel and opposing each other. Illumination source 530 emits light (shown as light 535) onto reflective display 540, which reflects light 545 onto surface 510. Light 545 is reflected off of surface 510 to surface 520; the light is then reflected back on to surface 510, and exits out of out-coupling region 590. In this embodiment, illumination source 530 and reflective display 540 are positioned at opposite sides of waveguide 500 with out-coupling region 590 disposed in between.

In this embodiment, to utilize the improved form factor created by non-parallel, reflective surfaces 510 and 520, illumination source 530 is positioned across from reflective display 540. Thus, as can be see in FIG. 5, illumination source 530 may be placed at a first end of the eyepiece that includes waveguide 500, while reflective display 540 is placed at the opposite end; when worn by a user, illumination source 530 may be to the side of the user's eye (e.g., near the nose bridge) so as not to interfere with the user's field of view.

Figure 6:
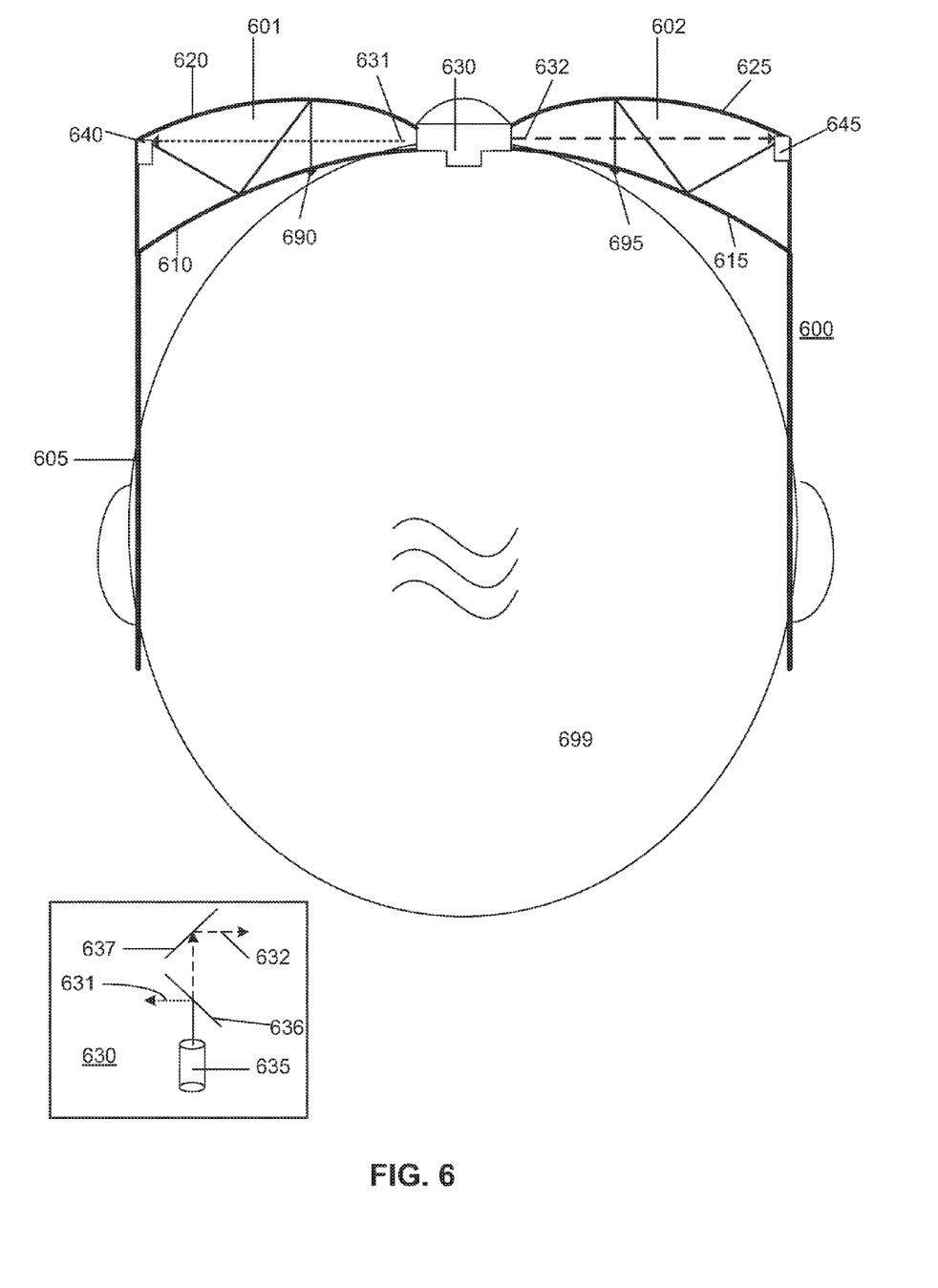
FIG. 6 is a top view of a demonstrative near-to-eye imaging system in accordance with an embodiment of the disclosure.

FIG. 6 is a top view of a demonstrative near-to-eye imaging system in accordance with an embodiment of the disclosure. The illustrated embodiment of imaging system 600 includes two image waveguides 601 and 602, frame 605, including a nose assembly, a left ear assembly, and a right ear assembly, and two reflective displays 640 and 645. In the illustrated embodiment, reflective displays 640 and 645 are disposed adjacent and parallel to the left and right ear assemblies of frame 605.

In this embodiment, image waveguides 601 and 602 form the eyepieces of a HMD and are secured into an eyeglass arrangement that can be worn on head 699 of a user. The left and right ear assemblies rest over the user's ears while the nose assembly rests over the user's nose. The frame assembly is shaped and sized to position out-coupling regions 690 and 695 of each image waveguide in front of a corresponding eye of the user with the emission surfaces facing the eyes.

Left and right (binocular embodiment) CGIs are generated by illumination source 630 in the nose assembly. Thus, illumination source 630 does not interfere with the user's field of view, and is included in the nose assembly of frame 600 so as not to adversely affect the form factor.

Illumination source 630 emits light 631 and light 632 onto both reflective displays 640 and 645, respectively. In one embodiment, illumination source 630 includes a polarizing beam splitter to split the incident light into two light beams of differing linear polarization. For example, the polarizing beam splitter of illumination source 630 is shown to include a polarizer 636 that reflects a first polarization component of the light from light source 635 to optical system 601 (i.e., light 631) while passing a second polarization component of the light, orthogonal to the first polarization component. The second polarization component is then reflected by mirror 637 at the appropriate angle to second optical system 602 (i.e., light 632).

CGI light reflected by reflective displays 640 and 645 is reflected back into their respective image waveguides, 601 and 602, and reflected off each waveguides' non-parallel reflective surfaces (610 and 620 for waveguide 601, 615 and 625 for waveguide 602). In one embodiment, surfaces 620 and 625 substantially collimate the CGI light and therefore virtually project the image at or near infinity. Although the human eye is typically incapable of bringing objects within a few centimeters into focus, since the output light is virtually displayed at or near infinity, the image is readily in focus.

The form factor of imaging system 600 may be adjusted, since waveguides 601 and 602 have non-parallel surfaces and the outer and inner lenses may have different curvatures. For example, outer lenses 620 and 625 may have a flatter curvature, similar to prescription lenses, while inner lenses 610 and 615 may have a more rounded curvature, similar to sunglass lenses.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A head mounted display comprising:
an optical system including:

an image source to generate light for the head mounted display;

first and second reflective surfaces non-parallel and opposing each other to receive the light along an optical path disposed at least partially between the first and second reflective surfaces, the first reflective surface to receive and reflect the light from the image source to the second reflective surface, the second reflective surface having a flatter curvature than the first reflective surface, wherein the first and the second reflective surfaces each comprise a partially transmissive surface to permit ambient external light to pass through the first and second reflective surfaces; and an out-coupling region included in the first reflective surface to pass light out of the first reflective surface to an eye of a user when the head mounted display is worn, the second reflective surface to receive and reflect light from the first reflective surface to the out-coupling region; and a frame assembly to support the optical system for wearing on a head of the user.

2. The head mounted display of claim 1, wherein at least one of the first and the second reflective surfaces is aspherical.

3. The head mounted display of claim 1, wherein at least one of the first and the second reflective surfaces comprises a free-form shape.

4. The head mounted display of claim 1, wherein the first reflective surface comprises a reflective polarizer to selectively reflect the light received from the image source as polarized light, and the second reflective surface includes a polarization rotator such that the second reflective surface rotates the polarized light received from the first reflective surface so that the rotated polarized light directed back towards the first reflective surface passes through the first reflective surface.

5. The head mounted display of claim 1, wherein a curvature of the second reflective surface is structured to magnify an image of the light received from the first reflective surface.

6. The head mounted display of claim 1, wherein the image source includes:
 a illumination source to emit the light; and
 a Liquid Crystal On Silicon (LCOS) panel to receive the light from the illumination source and to reflect the light on to the first reflective surface.

7. The head mounted display of claim 1, wherein the image source includes an Organic Light Emitting Display (OLED) to emit the light on to the first reflective surface.

8. The head mounted display of claim 1, wherein the head mounted display comprises a binocular head mounted display, the head mounted display further comprising:
 another optical system, the flame assembly coupled to support the other optical system for wearing on the head of the user.

9. The head mounted display of claim 8, further comprising:
 an illumination source to emit the light, wherein, for each optical system, the image source includes an LCOS panel to receive the light from the illumination source and to reflect the light onto the first reflective surface, and the frame further includes:
 a pair of arms to rest on the user's ears when the head mounted display is worn; and
 a nosebridge positioned between the pair of optical systems to rest on the user's nose when the head mounted display is worn, wherein the illumination source is disposed in, or adjacent to, the nosebridge of the frame, and the LCOS panel of each optical system is positioned proximate to one of the arms of the frame.

10. The head mounted display of 9, wherein the illumination source includes:
 a polarizing beam splitter positioned to transmit a first polarization component of the light to the optical system and to pass a second polarization component of the light; and
 a mirror to reflect the second polarization component of the light to the other optical system.

11. The head mounted display of claim 1, wherein the second reflective surface comprises a liquid crystal material to selectively block external ambient light.

12. An optical apparatus comprising:
 an image source to generate light for the optical apparatus;
 first and second reflective surfaces non-parallel and opposing each other to receive the light along an optical path disposed at least partially between the first and second reflective surfaces, the first reflective surface to receive and reflect the light from the image source to the second reflective surface, the second reflective surface having a flatter curvature than the first reflective surface, wherein the first and the second reflective surfaces each comprise a partially transmissive surface to permit ambient external light to pass through the first and second reflective surfaces; and
 an out-coupling region included in the first reflective surface to pass light out of the first reflective surface, the second reflective surface to receive and reflect the light from the first reflective surface to the out-coupling region.

13. The optical apparatus of claim 12, wherein at least one of the first and the second reflective surfaces is aspherical.

14. The optical apparatus of claim 12, wherein at least one of the first and the second reflective surfaces comprises a free-form shape.

15. The optical apparatus of claim 12, wherein the first reflective surface comprises a reflective polarizer to selectively reflect the light received from the image source as polarized light, and the second reflective surface includes a polarization rotator such that the second reflective surface rotates the polarized light received from the first reflective surface.

16. The optical apparatus of claim 12, wherein a curvature of the second reflective surface is structured to magnify an image of the light received from the first reflective surface.

17. The optical apparatus of claim 12, wherein the image source includes:
 an illumination source to emit the light; and
 a Liquid Crystal On Silicon (LCOS) panel to receive the light from the illumination and to reflect the light on to the first reflective surface.

18. The optical apparatus of claim 12, wherein the image source includes an Organic Light Emitting Display (PLED) to emit the light on to the first reflective surface.

19. The optical apparatus of claim 12, wherein the second reflective surface comprises a liquid crystal material to selectively block external ambient light.

20. A head mounted display comprising:
 an optical system including:
 an image source to generate light for the head mounted display;
 first and second reflective surfaces non-parallel and opposing each other to receive the light along an optical path disposed at least partially between the first and second reflective surfaces, the first reflective surface to receive and reflect the light from the image source to the second reflective surface; and an out-coupling region included in the first reflective surface to pass light out of the first reflective surface to an eye of a user when the head mounted display is worn, the second reflective surface to receive and reflect light from the first reflective surface to the out-coupling region; and a frame assembly to support the optical system for wearing on a head of the user, wherein the head mounted display comprises a binocular head mounted display further comprising another optical system, the frame assembly coupled to support the other optical system for wearing on the head of the user.

21. An optical apparatus comprising:

an image source to generate light for the optical apparatus;

first and second reflective surfaces non-parallel and opposing each other to receive the light along an optical path disposed at least partially between the first and second reflective surfaces, the first reflective surface to receive and reflect the light from the image source to the second reflective surface; and an out-coupling region included in the first reflective surface to pass light out of the first reflective surface, the second reflective surface to receive and reflect the light from the first reflective surface to the out-coupling region, wherein the first reflective surface comprises a reflective polarizer to reflect the light received from the image source as polarized light, and the second reflective surface includes a polarization rotator such that the second reflective surface rotates the polarized light received from the first reflective surface.

* * * * *